Figure 1:
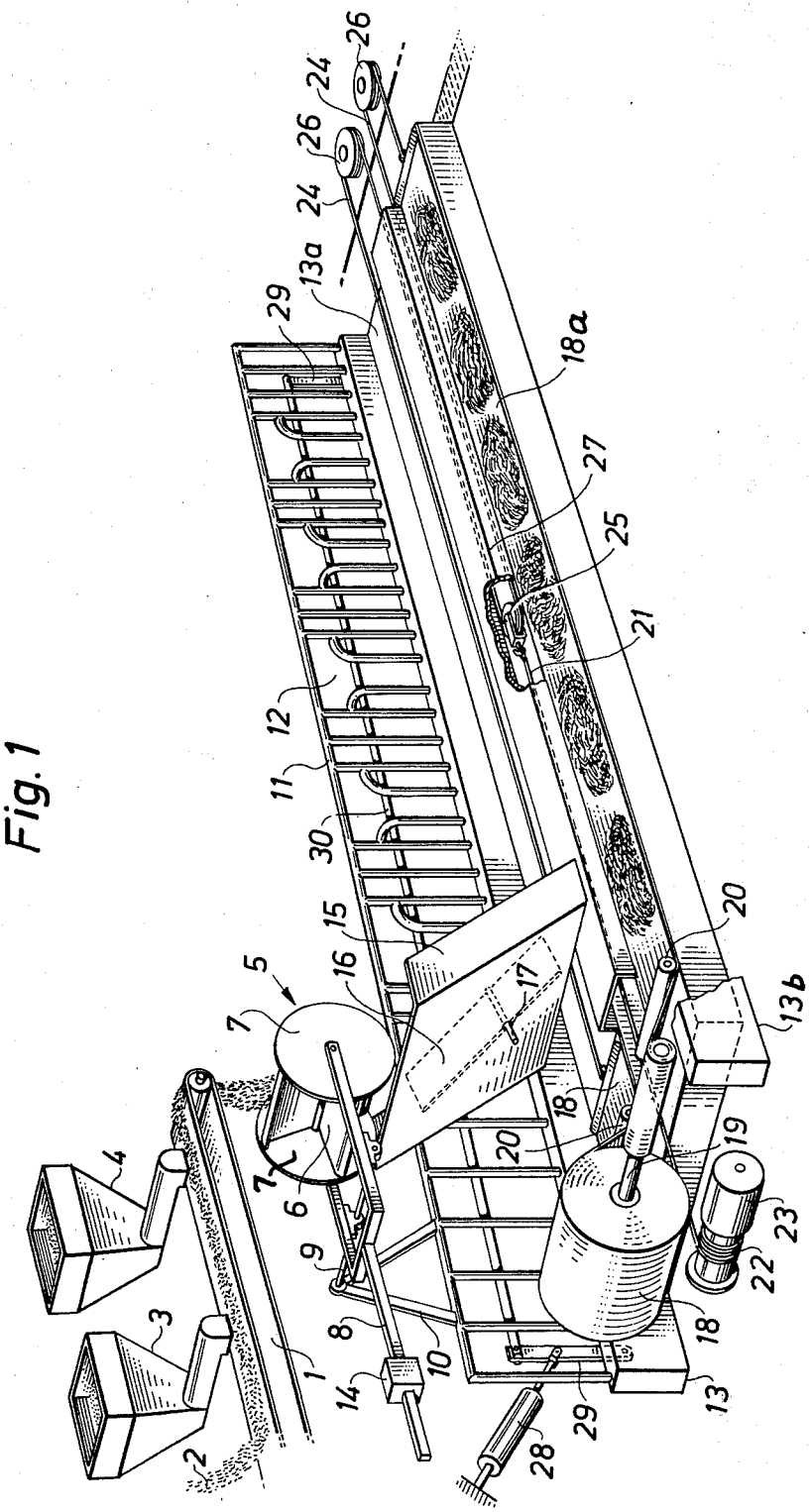

United States Patent [19]

Olsson

[11] 3,965,867

[45] June 29, 1976

[54] DEVICE FOR DELIVERING FEED PORTIONS TO DIFFERENT PLACES

[75] Inventor: Carl Anders Olsson, Eskilstuna, Sweden

[73] Assignee: Alfa-Laval AB, Tumba, Sweden

[22] Filed: Oct. 7, 1974

[21] Appl. No.: 512,601

[52] U.S. Cl. .......................... 119/52 AF; 119/56 R
[51] Int. Cl.² ........................................... A01K 5/02
[58] Field of Search ............. 119/56 R, 52 AF, 52 B

[56] References Cited
UNITED STATES PATENTS

| | | | |
|---|---|---|---|
| 579,245 | 3/1897 | Terry | 119/56 R |
| 3,310,033 | 3/1967 | Eichholz | 119/56 R |
| 3,333,574 | 8/1967 | Harris | 119/56 R X |

Primary Examiner—Hugh R. Chamblee
Attorney, Agent, or Firm—Cyrus S. Hapgood

[57] ABSTRACT

A conveyor strip is adapted to be unwound from a shaft to extend the strip along a row of feeding places, the strip being supported on an underlayer on which the strip slides as it is wound upon or unwound from the shaft. Feed portioning means operate to deliver feed portions of predetermined weight successively upon the conveyor strip so that the feed portions are moved to the respective feed places by extending of the strip along the row.

3 Claims, 2 Drawing Figures

DEVICE FOR DELIVERING FEED PORTIONS TO DIFFERENT PLACES

The present invention relates to a device for delivering feed in portions to a number of feed places, arranged in a row, in which device a feed portioning means operates, preferably automatically, for determining the weight of feed portions and delivering them to a conveyor, the latter being movable in the longitudinal direction of the row and arranged to be stopped in feeding position. Such a device is disclosed in British patent specification 1,249,055 and East German patent specification 98,440. These known devices consist of a plurality of troughs conveyed in a closed path.

The present invention aims at a simplification of these known devices and is characterized in that the conveyer comprises a conveyor strip which is arranged to be supported by sliding on an underlayer and to be wound on and unwound from a shaft at one of its ends. This means that it is possible to use a conveyor strip directly as a feed table instead of a plurality of troughs moving in a closed path. Furthermore, by winding the conveyor strip at its one end on a shaft, it is possible to avoid the need of arranging a channel on a lower level for a returning part of the conveyor strip. This channel would cause a hygienic problem by forming a collection place for feed dropped from the strip and consequently a haunt of rats. Additional advantages of the invention are the facts that because it is not necessary to arrange a channel for a returning part of the strip, the installation of the strip is simplified and only half the quantity of conveyor strip is necessary as compared with conventional installations, which means an appreciable saving of material.

According to the invention, a preferred embodiment of the feed portioning means is characterized in that it comprises a cylindrical drum whose interior is divided by radial partition walls which form compartments for receiving feed, and that the drum forms part of a balance for weighing the feed quantity received by a compartment, the drum being arranged to turn a step after a predetermined feed quantity has been received.

A further embodiment of the invention is characterized by an impulse-giving means for the control of the quantity and the composition of each individual feed portion.

Figure 2:
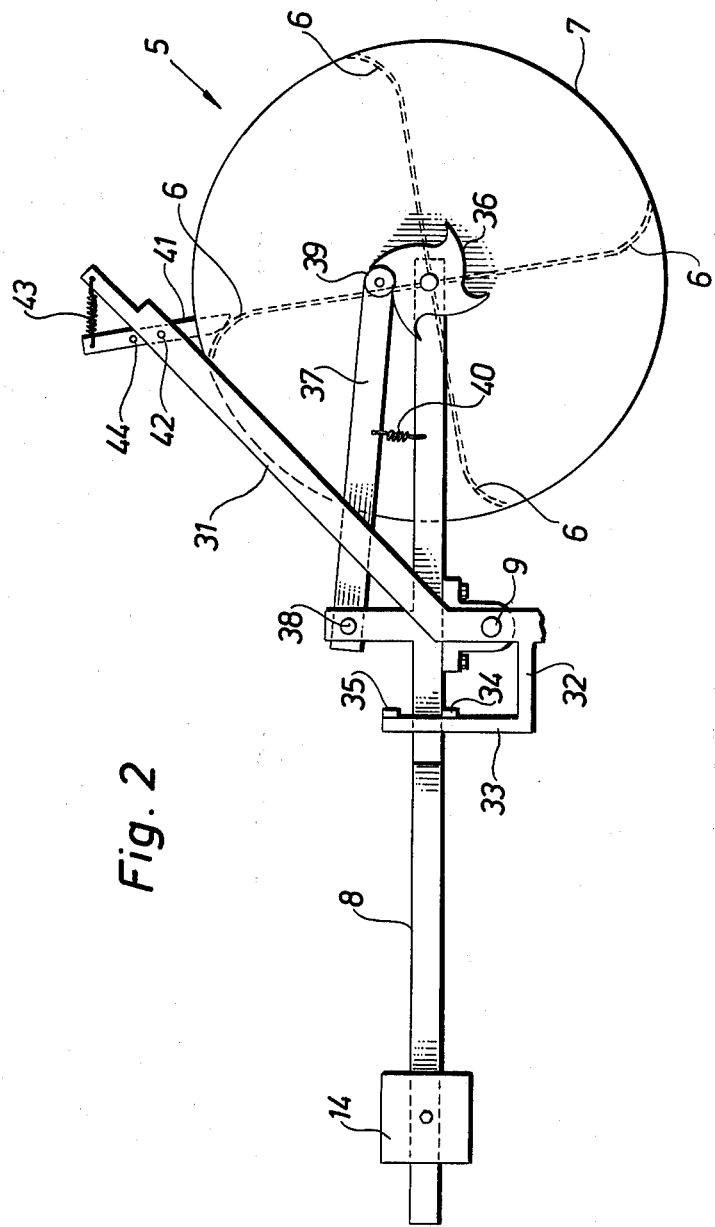

The invention is described more in detail below, reference being made to the accompanying drawings in which FIG. 1 is a perspective view of an embodiment, chosen by way of example, of the present feed delivering device, and FIG. 2 is an elevational view of the feed portioning means. In FIG. 1, certain parts are broken away so as to facilitate the illustration. In the two figures, the same reference numerals designate corresponding details.

In FIG. 1, an endless conveyor strip 1 is supplied with coarse feed 2. Portioning means for molasses, minerals and concentrated feed serve to feed the strip 1 and are shown at 3 and 4. The resulting feed mixture drops from the strip 1 down into a feed weighing means 5 having radial partition walls 6 which extend between two circular end walls 7 and catch the feed mixture. This drum 5–7 is carried by a fork-like lever 8 journalled by means of a shaft 9 in a pair of frames, only one of which is shown at 10 in FIG. 1. The frame 10 is carried by a rack 11 with openings 12 for the cow necks. The rack is mounted on a base 13 of concrete at one side of the device. The base 13b at the opposite side of the device also carries a rack and a frame like those at 11 and 10 in FIG. 1. The lever 8 is provided with a weight 14 displaceable along the lever in order to adjust the quantity of feed mixture to be delivered to the cows. When the portioning means 5 discharge a feed quantity, this quantity drops into a chute 15, in which a distribution board 16 is journalled by means of a shaft 17 so as to direct the discharged feed quantity to one or the other of two feed conveyor strips 18 and 18a, which can be wound on and unwound from a common shaft 19 while sliding on an underlayer 13a of concrete. The strip 18a is shown pulled out to its maximum length, and the other strip 18 is shown wound on the shaft 19. Idler rolls 20 keep down the left-hand ends of the strips 18–18a. A wire 21 is wound on and unwound from a roll 22 driven by an electric motor 23. A wire 24 is connected at its ends to the right-hand ends of the two strips 18–18a and runs over a rotary pulley 25, to which the right-hand end of the wire 21 is connected, and over two stationary, rotary pulleys 26. The wires 21 and 24 run partly in a protection channel 27. A pneumatically driven piston in a cylinder 28 actuates one of two levers 29, journalled at their lower ends, so as to raise a rod 30 from a lowered position in order to prevent the cows from eating feed before the delivering of all feed portions on the strips 18–18a is finished.

When the two strips 18–18a are completely wound on the shaft 19, the pulley 25 is in a position at the right-hand end of the device. When feed is to be delivered to the strip 18a, the board 16 is adjusted to direct the feed portions to said strip, and the end of the other strip 18 is blocked at the left-hand end of the device in any suitable manner (not shown) so that this strip cannot be pulled from shaft 19. When the motor 23 starts winding the wire 21, the pulley 25 moves to the left, thus pulling out the strip 18a while feed portions are delivered to this strip step-by-step. When this strip has received all its feed portions, the end of the other strip 18 is released and starts receiving its feed portions, after the board 16 has been adjusted to the corresponding position. Thereafter the rod 30 is lowered so that the cows can reach the feed portions. After the cows have finished eating the feed portions, the motor 23 is started to wind the two strips 18–18a on the shaft 19. To this end the motor is now disengaged from the roll 22 and connected to shaft 19 to drive the latter in the strip-winding direction through suitable transmission means (not shown). The shaft 19 consists of two parts which can rotate independently of each other when the strips 18–18a are unwound from the shaft 19 but which rotate together when driven in the opposite direction from motor 23.

FIG. 2 shows the feed portioning means 5 in more detail. The frames 10, in which the shaft 9 is journalled, are not shown in this figure for the sake of simplicity but carry a stationary arm 31 from which projects a horizontal arm 32. The latter arm carries an upright 33 provided with stops 34 and 35 limiting the vertical pivoting movements of the lever 8. A pawl disc 36 is fixed to one end wall 7 and cooperates with a lever 37 journalled by means of a pivot 38 on the lever 8 and carrying a rotary member 39 at its right-hand end. A spring 40 pulls the lever 37 towards the lever 8. A lever 41 is journalled by means of a pivot 42 on the arm 31 and is actuated by a spring 43 in a clockwise direction. Clockwise movement of the lever 41 is limited by means of a stop 44, and the lever 41 is shown abutting against one of the partition walls 6.

In the operation of the portioning means 5, the weight 14 is adjusted to a position on the lever 8 corresponding to a predetermined desired feed quantity. The feed mixture supplied from the strip 1 drops to the right-hand, almost horizontal partition wall 6 until the drum 5–7 sinks so much, owing to the weight of the collected quantity of feed mixture, that the drum will move clockwise and the edges of the upper partition wall and the lever 41 pass each other. At the same time the roller 39 on the lever 37 moves out of a recess in the pawl disc 36 and passes a point of said pawl disc. The collected quantity of feed mixture is now discharged from the drum 5–7, and the roller 39 enters the next recess of the pawl disc under the action of the spring 40. At the same time the lever 41 abuts against the next partition wall 6, and the formerly upper partition wall takes a position in which it receives a new quantity of feed mixture. The stop 44 ensures that the lever 41 takes such a position that it can abut against the newly positioned upper partition wall.

I claim:

1. In a device for delivering feed in portions to a plurality of feed places arranged in a row, the combination of a rotatable shaft adjacent one end of said row, an underlayer, a conveyor strip slidably supported on the underlayer when in an extended position and connected at one end to the shaft and initially wound thereon, means associated with the other end of the strip for unwinding the strip off the shaft and for extending the strip in only a single run along said row as unwinding the strip from the shaft occurs, the strip when extended along said row having said other end of the strip adjacent the other end of the row and at substantially the same level as said one end of the strip, and feed portioning means adjacent said one end of said row operable to deliver feed portions of predetermined weight successively upon the conveyor strip as the same is extended whereby the feed portions are moved to the respective feed places by said extending of the strip.

2. The combination of claim 1, in which said portioning means include a cylindrical drum having radial partition walls dividing the interior of the drum into compartments for receiving feed, and an arrangement supporting the drum as part of a balance for weighing each feed portion received by a compartment, said drum being supported for turning a step after a predetermined feed quantity has been received by the drum.

3. The combination of claim 1, comprising also means for controlling the quantity and the composition of each feed portion.

* * * * *